(12) United States Patent  
Jackson et al.

(10) Patent No.: US 9,406,957 B2  
(45) Date of Patent: Aug. 2, 2016

(54) HYDROGEN EXTRACTION

(75) Inventors: Gerald Peter Jackson, Lisle, IL (US); Jason Ryan Babcock, St. Charles, IL (US); Joseph Matthew Zlotnicki, Downers Grove, IL (US)

(73) Assignee: GREEN Light Industries, Inc., West Chicago, IL (US)

( * ) Notice: Subject to any disclaimer, the term of this patent is extended or adjusted under 35 U.S.C. 154(b) by 768 days.

(21) Appl. No.: 12/508,032

(22) Filed: Jul. 23, 2009

(65) Prior Publication Data

US 2010/0035103 A1 Feb. 11, 2010

Related U.S. Application Data

(60) Provisional application No. 61/083,092, filed on Jul. 23, 2008.

(51) Int. Cl.
| | |
|---|---|
| *B01D 46/22* | (2006.01) |
| *C01B 3/24* | (2006.01) |
| *C01B 31/02* | (2006.01) |
| *F02B 43/08* | (2006.01) |
| *F02M 25/12* | (2006.01) |
| *H01M 8/06* | (2016.01) |
| *B01D 46/00* | (2006.01) |
| *H01M 8/04* | (2016.01) |

(52) U.S. Cl.
CPC ......... *H01M 8/0612* (2013.01); *B01D 46/0079* (2013.01); *B01D 46/22* (2013.01); *C01B 3/24* (2013.01); *C01B 31/02* (2013.01); *F02B 43/08* (2013.01); *F02M 25/12* (2013.01); *C01B 2203/0266* (2013.01); *C01B 2203/04* (2013.01); *C01B 2203/049* (2013.01); *C01B 2203/0805* (2013.01); *C01B 2203/085* (2013.01); *C01B 2203/1235* (2013.01); *C01B 2203/1247* (2013.01); *C01B 2203/84* (2013.01); *H01M 8/04022* (2013.01); *H01M 8/0631* (2013.01); *Y02E 60/50* (2013.01); *Y02P 20/128* (2015.11); *Y02T 10/121* (2013.01); *Y02T 10/166* (2013.01); *Y02T 10/32* (2013.01)

(58) Field of Classification Search
CPC .................. B01D 46/0065; B01D 46/0075
USPC ........................................ 48/197 R
See application file for complete search history.

(56) References Cited

U.S. PATENT DOCUMENTS

| | | | |
|---|---|---|---|
| 7,097,675 B2 * | 8/2006 | Detering et al. | 48/127.9 |
| 2003/0008183 A1 * | 1/2003 | Hsu | 429/13 |
| 2003/0080473 A1 * | 5/2003 | Kelly et al. | 264/414 |
| 2004/0141893 A1 * | 7/2004 | Martin | 422/198 |
| 2004/0211163 A1 * | 10/2004 | Faulkner et al. | 55/486 |
| 2007/0204512 A1 * | 9/2007 | Self et al. | 48/197 FM |
| 2008/0017031 A1 * | 1/2008 | Vo | 95/148 |

* cited by examiner

*Primary Examiner* — Matthew Merkling  
(74) *Attorney, Agent, or Firm* — Peter K Trzyna

(57) ABSTRACT

Representatively, a method of separating carbon from hydrocarbon molecules, the method including: heating hydrocarbon molecules beyond their boiling point; decomposing the heated hydrocarbon molecules to generate elemental or molecular carbon and hydrogen gas; separating at least some of the elemental or molecular carbon from the hydrogen gas; chemically reacting the hydrogen gas to produce heat; and applying some of the heat in carrying out said heating.

45 Claims, 10 Drawing Sheets

Representative illustration of a carbon compactor.

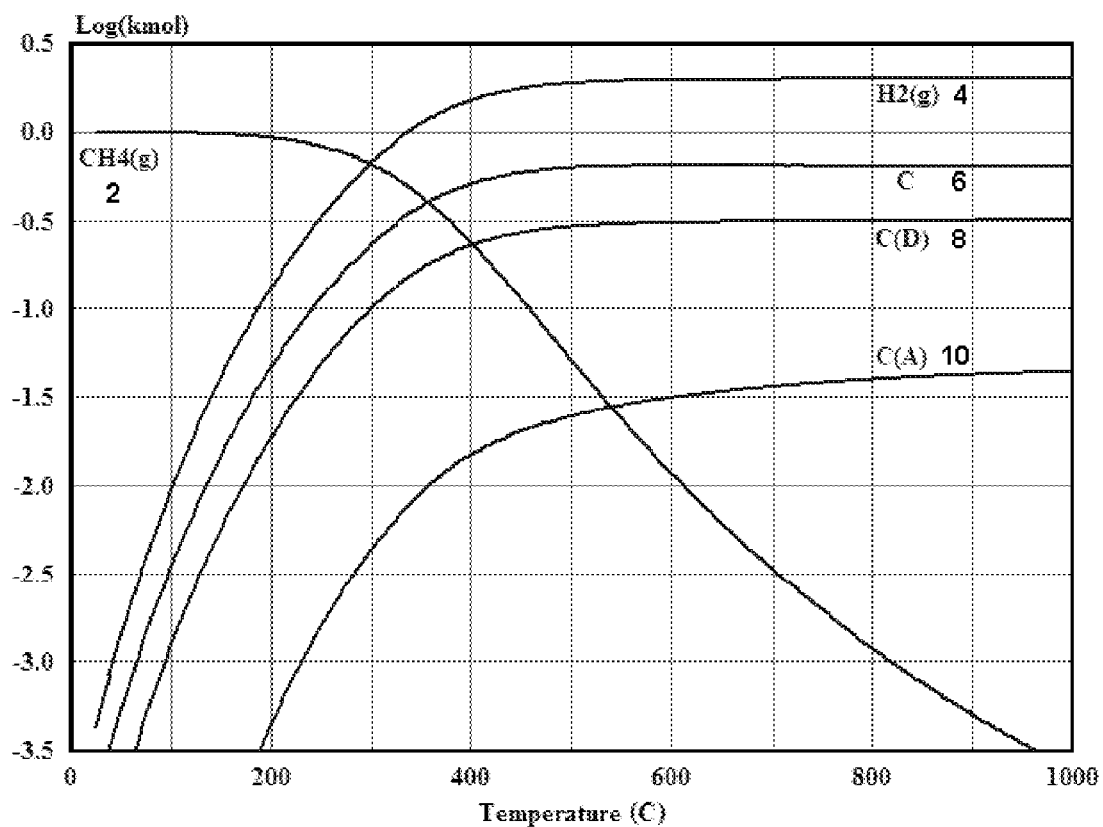
Figure 1: Plot of carbon disassociation from methane at elevated temperatures.

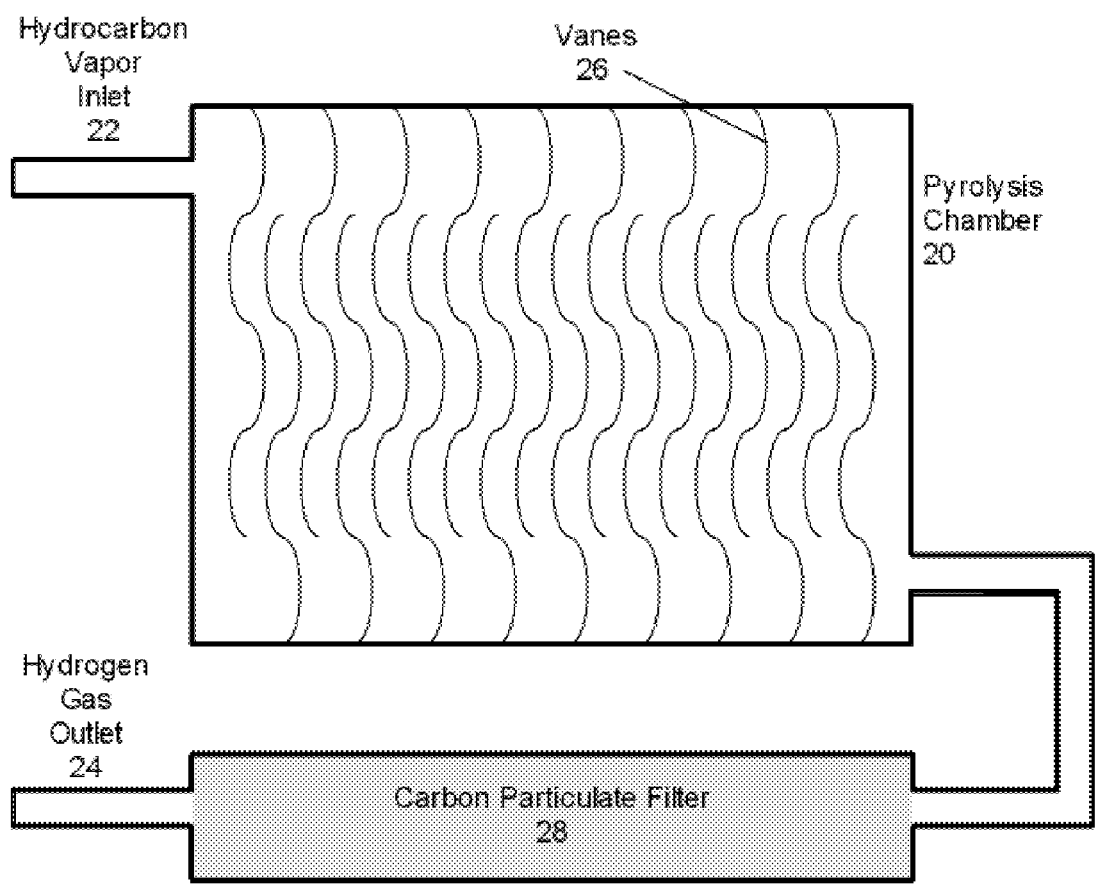
Figure 2: Representative illustration of a pyrolysis chamber.

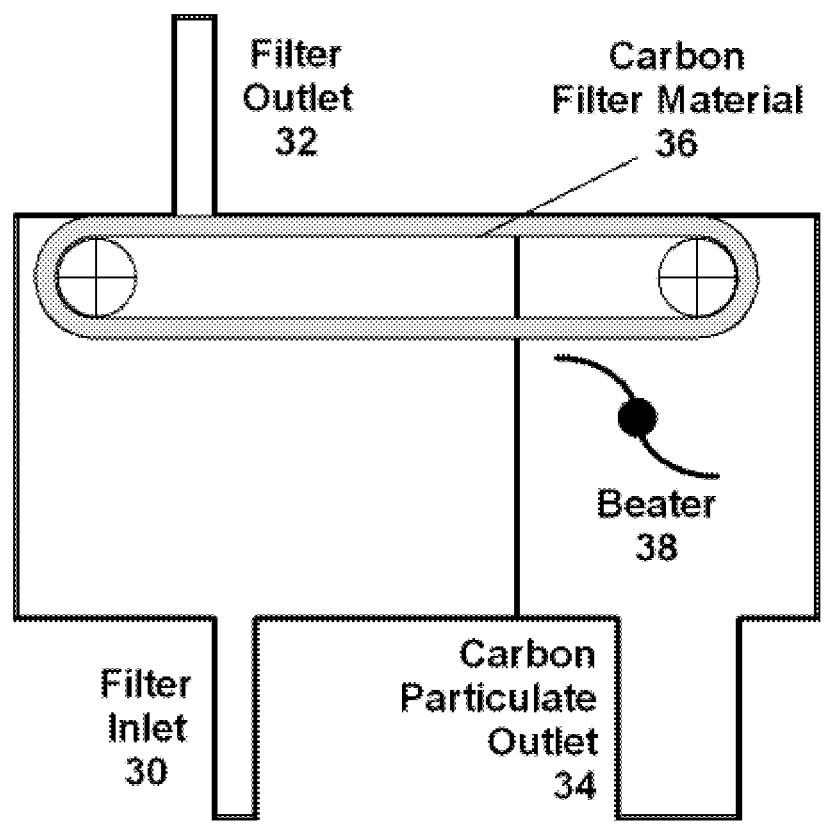
Figure 3: Representative illustration of a carbon particulate filter.

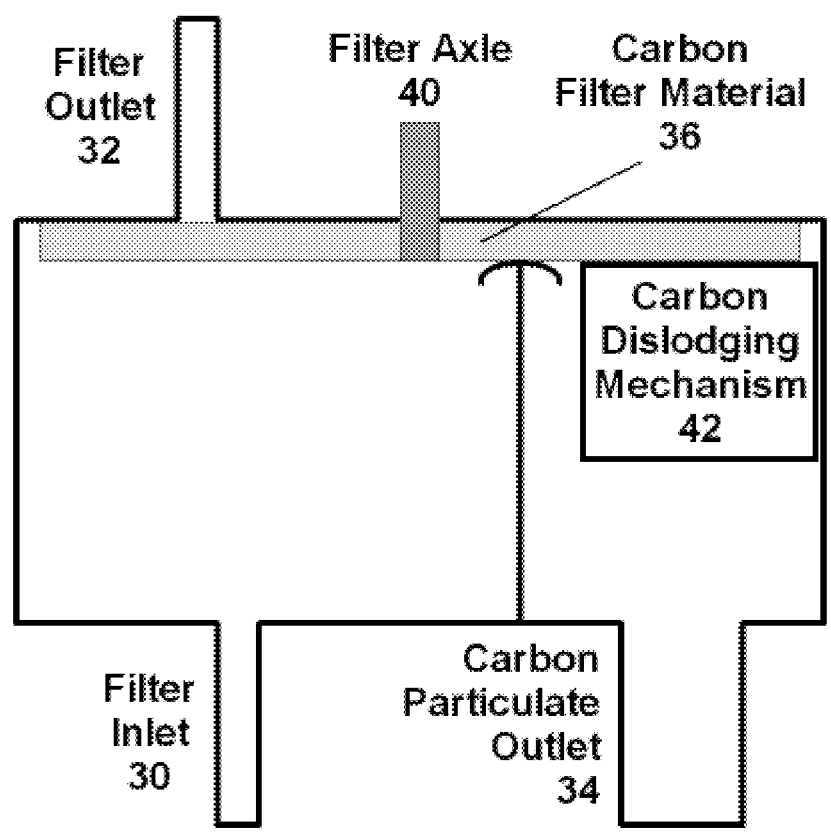
Figure 4: Representative illustration of a carbon particulate filter.

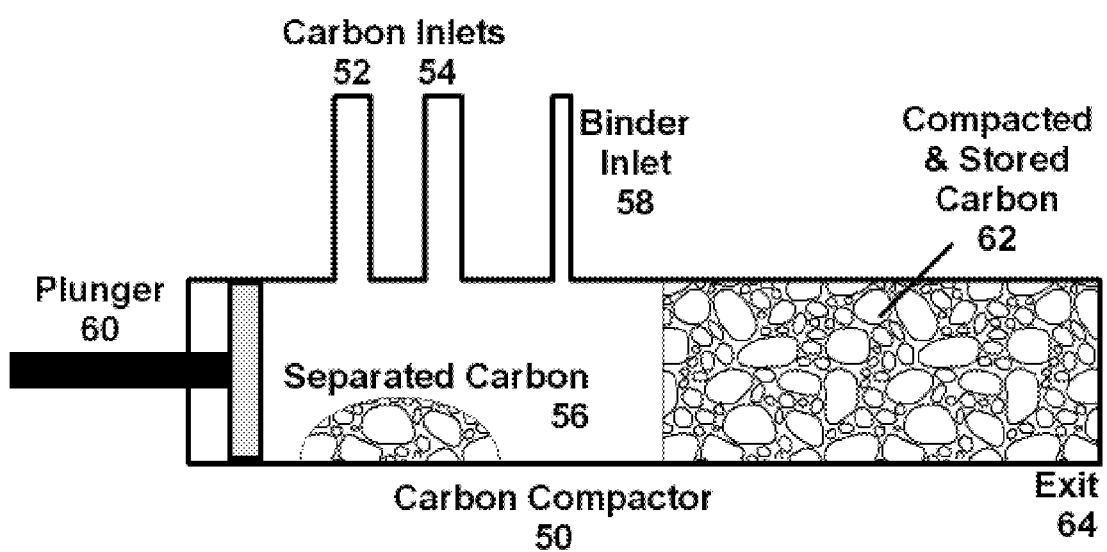
Figure 5: Representative illustration of a carbon compactor.

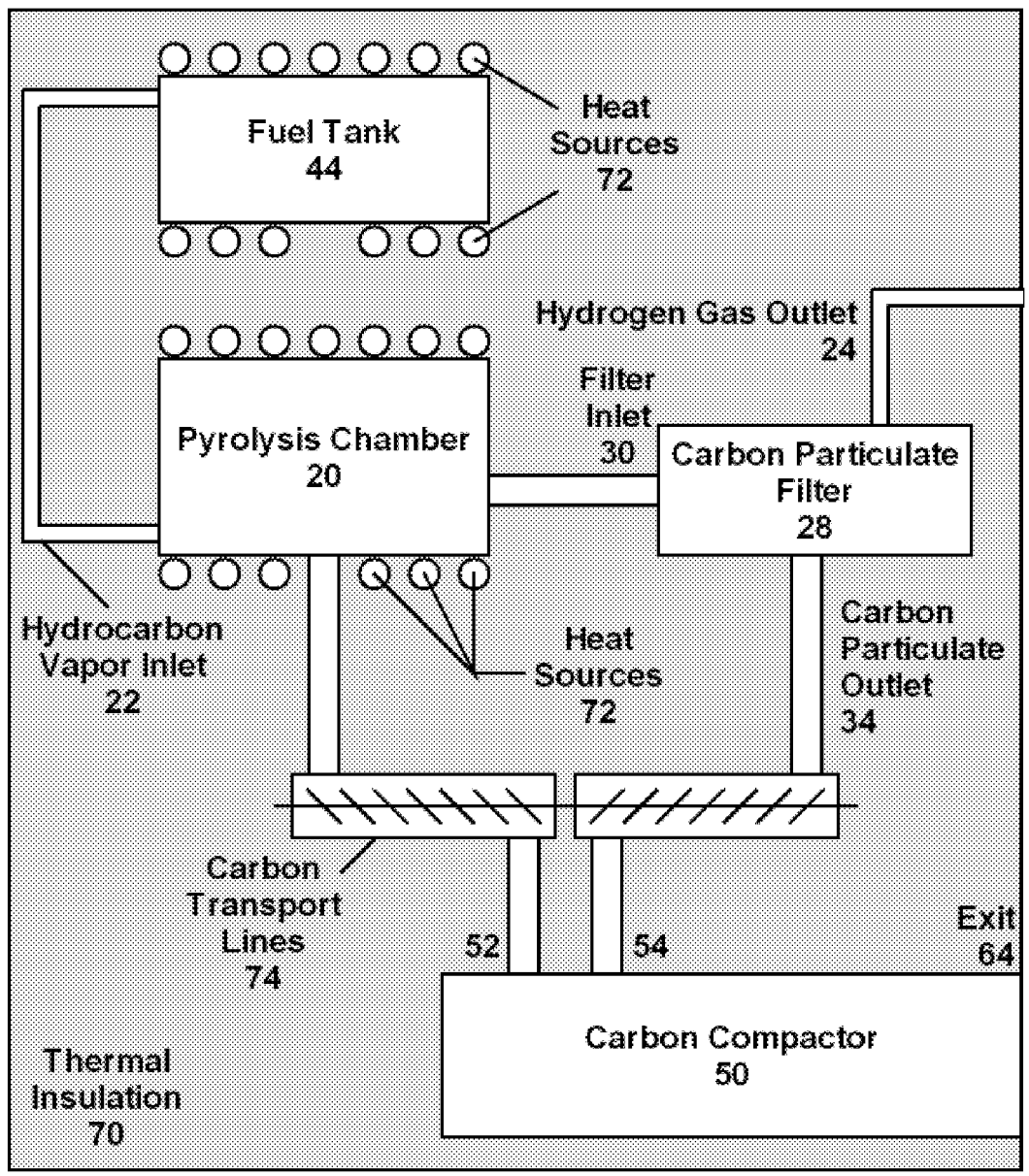
Figure 6: Representative illustration of a system composed of a pyrolysis chamber, carbon particulate filter, and carbon compactor.

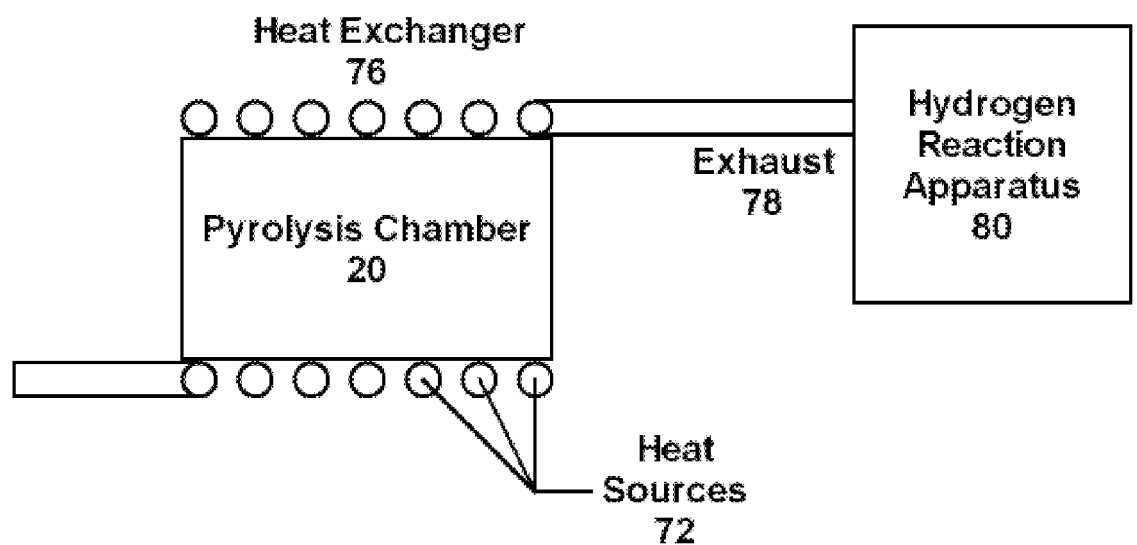
Figure 7: Representative illustration of a pyrolysis chamber heater based on hydrogen combustion exhaust gases.

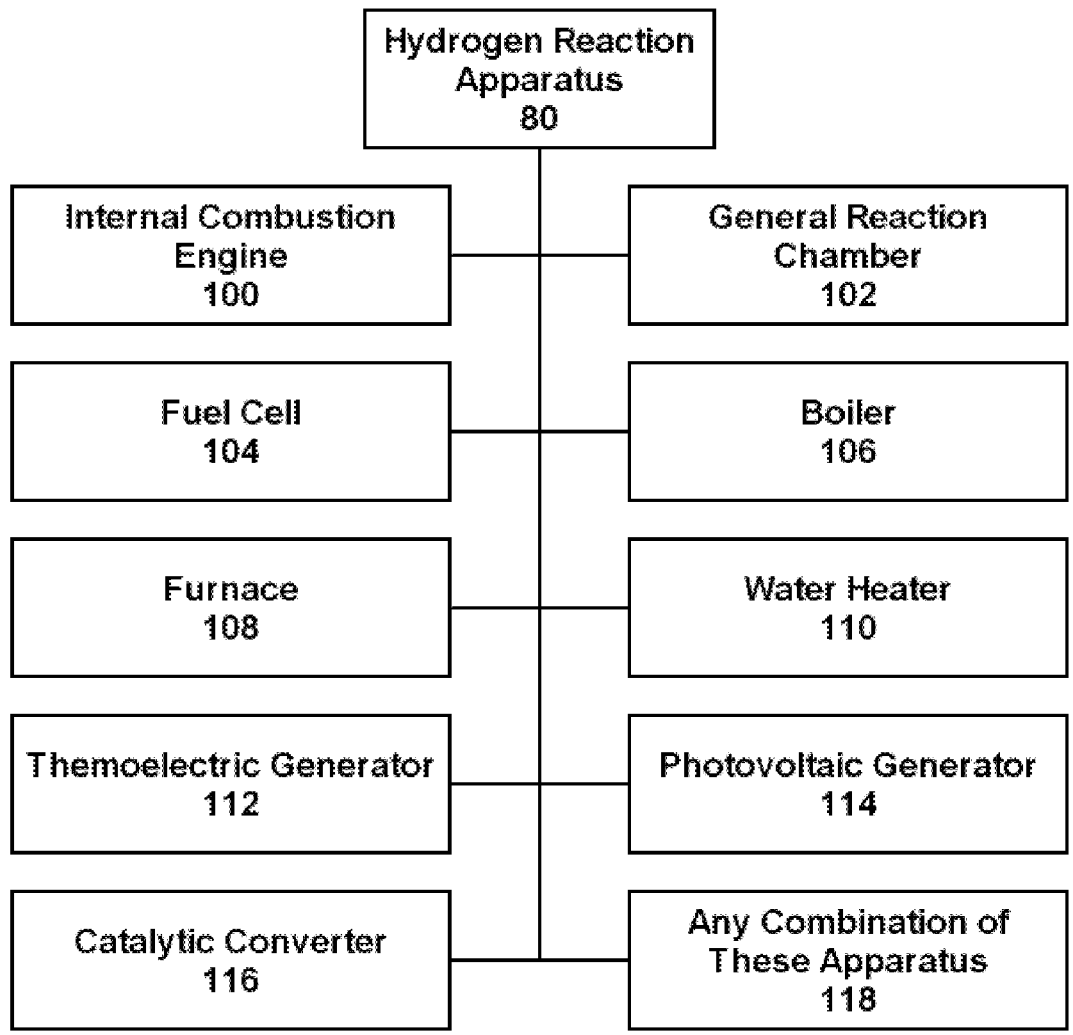
Figure 8: Chart showing representative heat sources.

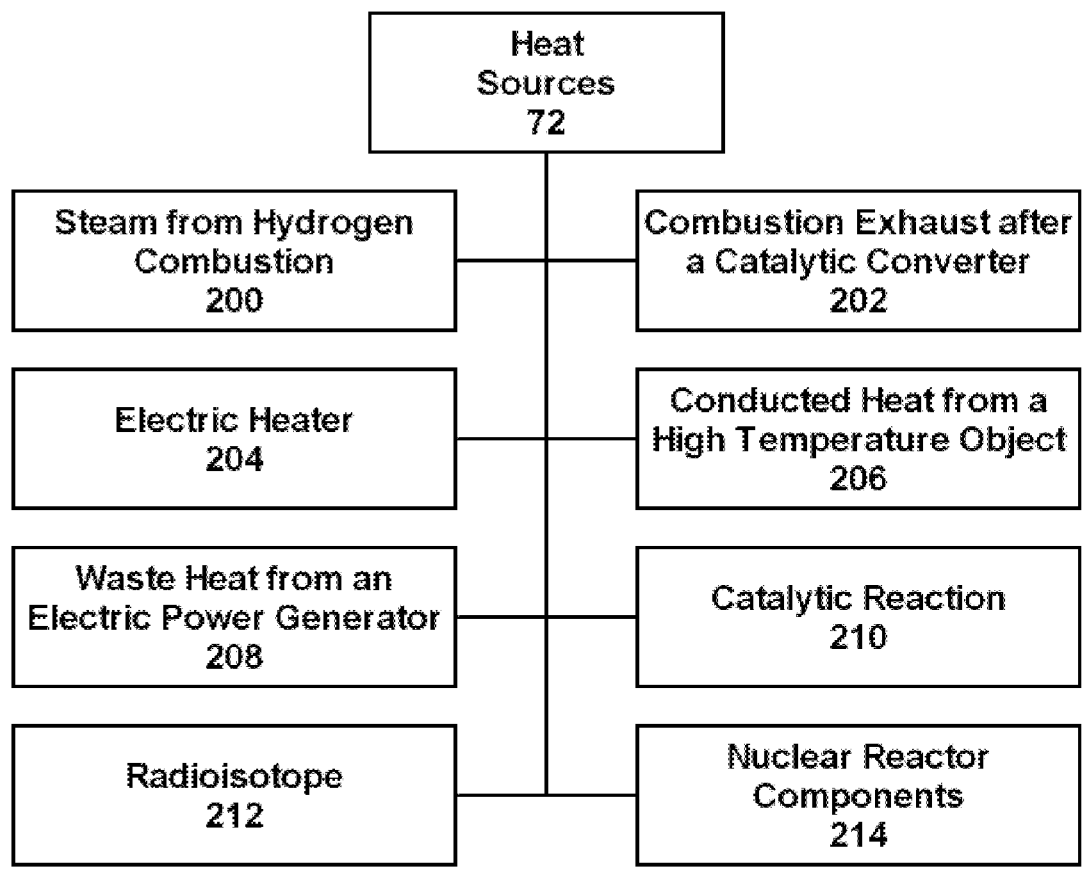
Figure 9: Chart showing representative apparatus utilizing hydrogen reactions.

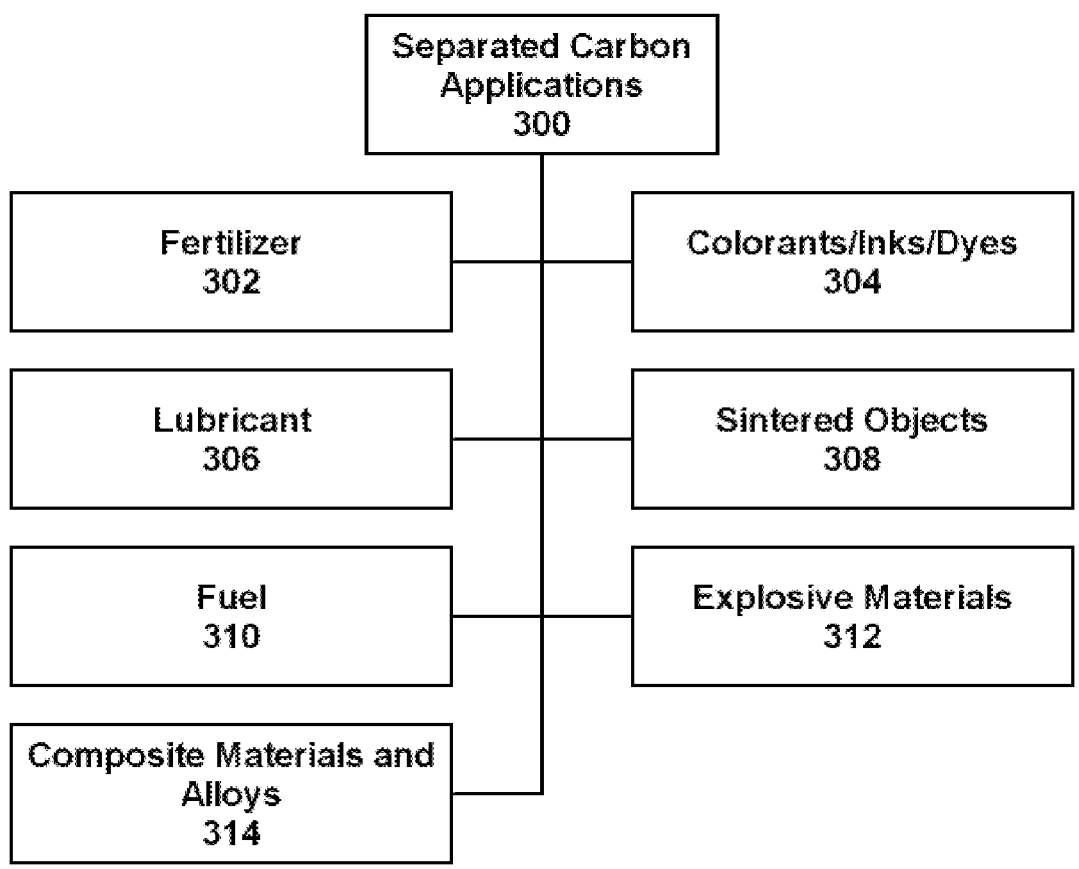
Figure 10: Chart showing representative applications for separated carbon.

HYDROGEN EXTRACTION

I. PRIORITY STATEMENT

The present patent application claims benefit from, and incorporates by reference as if completely repeated herein, from U.S. Patent Application Ser. No. 61/083,092 filed Jul. 23, 2008.

II. FIELD OF THE INVENTION

The technical field includes machine, manufacture, process, and product produced thereby, as well as necessary intermediates. In some cases, the technical field may pertain to hydrogen extraction.

III. BRIEF DESCRIPTION OF THE DRAWINGS

FIG. 1 contains a plot of carbon disassociation from methane with elevated temperatures.

FIG. 2 contains a representative illustration of a pyrolysis chamber.

FIG. 3 contains a representative illustration of a carbon particulate filter.

FIG. 4 contains a representative illustration of a carbon particulate filter.

FIG. 5 contains a representative illustration of a carbon compactor.

FIG. 6 contains a representative illustration of a system composed of a pyrolysis chamber, carbon particulate filter, and carbon compactor.

FIG. 7 contains a representative illustration of a pyrolysis chamber heater based on hydrogen combustion exhaust gases.

FIG. 8 contains a chart showing representative heat sources.

FIG. 9 contains a chart showing representative apparatus utilizing hydrogen reactions.

FIG. 10 contains a chart showing representative applications for separated carbon.

IV. MODES

From a molecule including hydrogen and at least one element that is not hydrogen, hydrogen can be extracted from the at least one element that is not hydrogen, or vice versa depending on one's frame of reference: They are viewed herein as the same in that the result is $H_2$ production from the molecule. Similarly, for example, from ammonia, consider extracting the hydrogen from the nitrogen, or vice versa; for another example, from a hydrocarbon, consider extracting the hydrogen from the carbon, or vice versa. In either example, and whichever way it is viewed, the result is $H_2$ production from the molecule. There can be a system using a flow of molecules that results in the $H_2$ production. In some cases, the extraction of the hydrogen can be carried out essentially continuously in an inert environment, as by heat sufficient to break the molecular bonding of the hydrogen, and in some cases, the at least one element that is not hydrogen can be sequestered from the hydrogen. For example, from a hydrocarbon, hydrogen can be located separate from the carbon.

Though this specification disclosure addresses all such embodiments and more, for the prophetic teaching purposes herein, consider hydrocarbons as a representative example. The chemical composition of gasoline is mostly in the form of hydrocarbon molecules of the form $C_nH_{2n+2}$ where C represents carbon atoms, H represents hydrogen atoms, and n is an integer with a mean value of approximately seven. Because carbon has an atomic mass of 12 and hydrogen has an atomic mass of 1, 84% of the weight of gasoline is the carbon. Similarly, natural gas is mainly composed of methane, wherein 75% of its weight is the carbon.

When gasoline burns completely in air, the two dominant products are carbon dioxide ($CO_2$) and water vapor ($H_2O$). At optimal mixing in, say, an internal combustion engine, for every pound of gasoline consumed by an internal combustion engine, such as those on lawnmowers, approximately 3 lbs of oxygen is drawn out of the atmosphere. Because oxygen only makes up a fifth of the atmosphere, roughly 15 lbs of air is cycled through the engine.

For every gallon of gasoline consumed by the lawnmower, just under 20 lbs of carbon dioxide is generated. In this combustion process, about 36.6 kW-hrs of thermal energy is generated for every gallon of gasoline. If this carbon were to be removed somehow before the combustion process, the dominant mechanism in the engine would be hydrogen combustion. Under these circumstances, only about 14 kW-hrs of thermal energy would be generated for every gallon of gasoline.

Therefore, for the same engine output, about 2.6 times more gasoline is required if carbon is removed before combustion. For applications wherein engine efficiency is not particularly important, such as lawnmowers, snow blowers, and emergency generators, the elimination of carbon dioxide emissions makes both economic and environmental sense. Alternatively, take for example the replacement of the automotive internal combustion engine with a new technology that improves fuel efficiency by a factor near the 2.6 that burns hydrogen. Such a technology is taught in U.S. patent application Ser. No. 11/828,311 titled "Power Source" by Dr. Gerald P. Jackson and U.S. Provisional Patent 60/900,866 titled "Tuned Photovoltaic Conversion of Chemical Energy" by Dr. Gerald P. Jackson, both of which are incorporated herein by reference. In such a case the overall usage of gasoline is unchanged (assuming complete technology adoption), but emissions of carbon would be eliminated.

In addition to the carbon dioxide and water vapor formed by the combustion of gasoline (or any hydrocarbon used as a fuel), there are also other vapors emitted out of the exhaust of an internal combustion engine. One type is incompletely combusted hydrocarbon vapors (HC), which are credited as smog-producing emissions. A second is carbon monoxide (CO), which along with its role in the creation of smog, is also biologically harmful to the point of causing poisoning (in fact, according to the paper Omaye ST. (2002). "Metabolic modulation of carbon monoxide toxicity". Toxicology 180 (2): 139-50, more than 50% of all human poisoning cases in the world are caused by carbon monoxide).

However, when hydrocarbons are heated in an inert (or nonreactive with hydrogen or, in this example, carbon) atmosphere above a certain critical temperature, the hydrogen-carbon bonds can break, causing the carbon and hydrogen to separate (noting again that carbon is illustrative of at least one element that is not hydrogen). Technically, this process of pyrolysis causes the hydrocarbon molecules to disassociate. For example, U.S. Pat. No. 7,335,320 (incorporated herein by reference) is worth noting not only for its discussion of producing hydrogen from solid fuels, but also the burning of carbon and the subsequent need to employ difficult and expensive technologies to sequester carbon dioxide. Similarly, U.S. Pat. No. 7,282,189 (incorporated herein by reference) is also worth noting for its discussion of the production of hydrogen and elemental carbon from natural gas and other hydrocarbons, but also of the use of carbon for alternative applications.

Though time and temperature can be related, as a practical matter it appears that heating gasoline or propane to 900° C. or higher can be sufficient for a disassociation process to take place quite efficiently. FIG. 1 contains a prophetic plot of equilibrium methane 2 decomposition to hydrogen gas 4, amorphous carbon 6, diamond crystal 8, and other crystal phases 10 as temperature is increased. These forms of carbon can be in the form of elemental carbon or molecules of carbon. Because of the relationship of thermal decomposition efficiency with time and temperature, embodiments can include systems that have shorter fuel dwell times at a temperature of 1000° C., intermediate dwell times at a temperature of 900° C., and longer dwell times at a temperature of 800° C.

Carbon can be a solid at these temperatures, and the carbon tends to accumulate on the walls of a pyrolysis chamber or tube (called "coking"), causing the flow of hydrocarbon vapor and hydrogen through the chamber or tube to slow until the entire process stops. To deal with this issue, steam can be flushed through the chamber simultaneously (called "steam cracking"), continuously washing out the accumulating carbon.

Coking can be used for diamond deposition on knife blades and other surfaces. By decomposing methane and using solvents to remove the amorphous carbon and crystal phases other than diamond, a layer of diamond can be deposited on a surface. See for example U.S. Pat. No. 5,360,227, incorporated herein by reference. However, the diamond film and the substrate material can tend to loose their bond with each other when the substrate is flexed or undergoes a large temperature fluctuation.

In an embodiment shown in FIG. 2, a series of flexible vanes 26 or at least one other surface within a pyrolysis chamber 20 form a labyrinth or complex pathway (e.g., multiple turns) through which a hydrocarbon vapor travels. Hydrocarbon vapors flow though an inlet 22 and are heated by vanes 26 or the like which are adapted for receiving the carbon and having the carbon removed therefrom, e.g., vanes that are flexing periodically or continuously. At least some of the hydrocarbon vapor is decomposed into carbon and hydrogen gas. The carbon can be deposited on the vanes 26 or the pyrolysis chamber 20 walls, or can flow with the hydrocarbon vapors and hydrogen gas in a form reminiscent of dust. A carbon particulate filter 28 prevents the carbon from reaching the hydrogen gas outlet 24. Note that some amount of residual hydrocarbon vapor can also reach the outlet 24. The amount of hydrocarbon vapor relative to the amount of hydrogen gas that reaches the outlet 24 can be controlled by gas flow rate, length of the labyrinth, and the temperature of the vanes 26 and pyrolysis chamber 20 walls.

In an embodiment shown in FIG. 3, the carbon particulate filter 28 is constructed such that it is self-cleaning. While FIG. 3 shows the carbon filter material 36 in a conveyor belt type geometry, it can also be oriented as a disk rotated about an axle 40 as shown in FIG. 4 or a functional equivalent. In such geometries, the filter 28 includes an inlet 30 for the output of the pyrolysis chamber, an outlet 32 for hydrogen gas and residual hydrocarbon vapor, and an outlet 34 for separated particulate carbon. In this example, a rotating beater 38 can be used to dislodge accumulating carbon particulates from the filter material 36.

In another embodiment, instead of the beater 38 (or in combination with the beater 38) there can be another device 42 that dislodges the particulate carbon. Specific examples include a mechanical vibrator, an electromagnetic vibrator, gas or liquid jets or sprays, or piezoelectric vibrator. In one specific embodiment, the mechanical vibrator can have a vibration amplitude and frequency similar to that of an electric shaver. In another specific embodiment, the electromagnetic vibrator can be similar in construction to the yoke of a loudspeaker.

Both the pyrolysis chamber 20 and the carbon particulate filter 28 capture solid carbon in the form of fine dust, powder, crystals, and/or flakes. At normal atmospheric pressure and moderate levels of vibration, these forms of carbon can compact into a solid mass at a small fraction of the nominal density of carbon (2.2 grams/cubic centimeter).

In embodiments in which the density of this separated carbon is desired to be increased, e.g., due to volume limitations for carbon storage, a carbon compaction system can be utilized.

In one embodiment, illustrated in FIG. 5, the carbon is pressed in a manner reminiscent of hay baling. Carbon separated in the pyrolysis chamber 20 and the carbon particulate filter 28 enter a carbon compactor 50. This can be accomplished with two inlets, one 52 connected to the pyrolysis chamber 20 and the other 54 from the carbon particulate filter 28. This separated carbon 56 enters the compactor 50 while the compacting plunger 60 is near its minimum depth into the compactor 50. Periodically, the plunger 60 pushes the separated carbon toward the exit 64 of the compactor, forming a compacted mass of carbon 62 that can be located in an area for storage. In one embodiment a binder inlet 58 is attached to the compactor 50 for the purpose of injecting binder material that helps the compacted carbon 62 to hold its shape and density.

A representative illustration of one embodiment of how these components can cooperate together is shown in FIG. 6. In situations where overall energy efficiency is a concern, one or all of the components can be covered in thermal insulation 70. The hydrocarbon vapor inlet 22 connects the pyrolysis chamber 20 to a fuel tank 44, and may itself contain heaters and filters to ensure efficient hydrocarbon vapor flow, independent of the type of hydrocarbon stored in the fuel tank 44. For example, consider an embodiment of an engine powering a vehicle, the engine operable on paraffin, heavy fuel oil, kerosene, diesel fuel, and gasoline without any changes to the engine, which is essentially using hydrogen for power, after the carbon has been sequestered from the combustion of the hydrogen.

Because energy is required to decompose the hydrocarbon molecule, in one embodiment a heat source 72 is in thermal contact with the pyrolysis chamber 20. While a heat exchanger is an embodiment of a heat transport mechanism for thermal communication, any other mechanism that transports thermal energy, such as a copper rod, ammonia heat pipe, steam loop, may be used. In an embodiment that enhances fuel efficiency, the heat source 72 is waste heat from hydrogen combustion in a hydrogen reaction apparatus 80 illustrated in FIG. 7. As shown in FIG. 7, one form of waste heat is the steam in the exhaust 78 of the hydrogen reaction apparatus 80 (the oxidation/burning of hydrogen creates water vapor/steam). The heat is transferred to the pyrolysis chamber 20 via a steam heat exchanger 76 in thermal contact with the pyrolysis chamber 20.

The separated carbon 56 from the pyrolysis chamber 20 and the carbon particulate filter 28 (via a carbon particulate outlet 34) may be injected into a carbon compactor 50. If the distance is significant from the pyrolysis chamber 20 and carbon particulate filter 28 and the carbon compactor 50, one embodiment includes carbon transport lines 74 to cover this distance. In one embodiment, the carbon transport lines 74 utilize an auger. In another embodiment, the lines 74 utilize a conveyer belt.

As seen in FIG. 8, the hydrogen reaction apparatus 80 can be an internal combustion engine 100, and general reaction chamber 102, a fuel cell 104, a boiler 106, a furnace 108, a water heater 110, a thermoelectric generator 112, a thermovoltaic or photovoltaic generator 114, or a catalytic converter 116. Alternatively, any combination 118 of two or more of the above apparatus in combination may be energized with the hydrogen. One embodiment of a photovoltaic generator based on harvesting of blackbody radiation emitted from a surface heated with chemical energy is disclosed in U.S. patent application Ser. No. 11/828,311 by one of the current inventors, and incorporated herein by reference. Note that one advantage of this system is that hydrogen combustion can take place at an elevated temperature, thereby resulting in more efficient energy utilization. In one preferred embodiment this elevated temperature is above 500° C.

As seen in FIG. 9, the heat source 72 can be steam from hydrogen combustion 200, combustion exhaust after a catalytic converter 202, one or more electric heaters 204, heat conducted from another high temperature object 206, waste heat from an electric power generator 208, a catalytic reaction 210, heat from radioisotopic decays 212, heat from a nuclear reaction 214. In addition, embodiments include combinations of two or more of the above sources. One embodiment of a small engine exhaust being passed through a combination muffler/catalytic converter 202 is disclosed in U.S. Patent Application No. 61/083,007, filed by the current inventors on Jul. 23, 2008, titled "Catalytic Smog Reduction", and incorporated herein by reference.

Once the separated carbon is accumulated, it can be disposed or utilized for other applications 300. As seen in FIG. 10, the carbon can be used as a fertilizer 302, as a colorant such as inks or dyes, as a lubricant 306, as an ingredient in the production of sintered objects 308, as a fuel 310, as an ingredient in explosives 312, or as an ingredient in composite materials or alloys 314.

In accordance herewith, embodiments herein can be devoid of nanotube usage in the production of the hydrogen.

This line of embodiments can use waste heat to decompose hydrocarbon fuels and separate carbon and hydrogen before combustion. This approach is useful in reducing pollutant emission levels from engines fueled by hydrocarbons, and for reducing the emission of carbon dioxide, a recognized cause of global warming. Moreover, embodiments can utilize the carbon separated before combustion for non-combustion purposes, such as fertilizer.

From a broader view, the approach herein can be used to extract hydrogen from shale or other hydrocarbons that are difficult to use as fuels. Also, coal, garbage, waste, hazardous materials, etc., can all be used to provide hydrogen.

But let us step back now from the detailing of sequestering the hydrogen from the carbon of a hydrocarbon to understand this example as a teaching example of a broader concept, as stated above: "From a molecule including hydrogen and at least one element that is not hydrogen, hydrogen can be extracted from the at least one element that is not hydrogen, or vice versa depending on one's frame of reference: they are viewed herein as the same in that the result is $H_2$ production from the molecule. Similarly, for example, from ammonia, consider extracting the hydrogen from the nitrogen, or vice versa; for another example, from a hydrocarbon, consider extracting the hydrogen from the carbon, or vice versa. In either example, and whichever way it is viewed, the result is $H_2$ production from the molecule. There can be a system using a flow of molecules that results in the $H_2$ production. In some cases, the extraction of the hydrogen can be carried out essentially continuously in an inert environment, as by heat sufficient to break the molecular bonding of the hydrogen, and in some cases, the at least one element that is not hydrogen can be sequestered from the hydrogen. For example, from a hydrocarbon, hydrogen can be located separate from the carbon." A workable proviso is that there is more $H_2$ emerging from the environment than went into the environment, The environment can be structured so that there is no degradation of conductance through the environment caused by flow of the molecules that produced the $H_2$. Such a structure can implement an essentially continuous process (i.e., no need to interrupt the process to clean the structure due to the particular molecules that produced the $H_2$.

Note again that the foregoing detailing has particularly picked up characteristics suitable for carbon, but perhaps not as suitable for some other element that is not hydrogen, e.g., ammonia. Ammonia, etc., works likewise, and depending on the embodiment of interest for a particular application, one need not sequester. For example, the nitrogen need not be sequestered from the hydrogen prior to the combustion; rather the embodiment can pass the separated hydrogen and nitrogen together into the combustion chamber of the engine.

Note that the preceding is a prophetic teaching, and although only a few exemplary embodiments have been described in detail herein, those skilled in the art will readily appreciate that many modifications are possible in the exemplary embodiments without materially departing from the novel teachings and advantages herein. Accordingly, all such modifications are intended to be included within the scope herein. Means-plus-function language is intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment fastening wooden parts, a nail and a screw may be equivalent structures.

What is claimed is:

1. A method of separating carbon from hydrocarbon molecules, the method comprising:
   heating hydrocarbon molecules beyond their boiling point;
   decomposing the heated hydrocarbon molecules to generate elemental or molecular carbon and hydrogen gas;
   separating at least some of the elemental or molecular carbon from the hydrogen gas;
   compacting said separated elemental or molecular carbon with a plunger to form a compacted mass of said separated elemental or molecular carbon;
   chemically reacting the hydrogen gas to produce heated exhaust gasses; and
   applying some of the heated exhaust gasses, using a heat exchanger, in carrying out said heating.

2. The method of claim 1, wherein: the heating is carried out with a heater having a capability of heating hydrocarbon molecules beyond their boiling point;
   the decomposing is carried out with a chamber configured to receive the heated hydrocarbon molecules and to decompose the heated hydrocarbon molecules into elemental or molecular carbon and hydrogen gas;
   the separating is carried out with a filter located to separate at least some of the elemental or molecular carbon from the hydrogen gas; and
   the applying is carried out with a reaction chamber arranged to produce heat by using the hydrogen gas in a chemical reaction and to communicate some of the heat to the heater via the heat exchanger.

3. The method of claim 1, wherein the applying includes harvesting heat from exhaust gasses from said chemical reacting.

4. The method of claim 1, wherein the applying includes applying heat from a catalytic converter in a path of exhaust gas resulting from said chemical reacting.

5. The method of claim 1, wherein the heating includes providing heat from an electrically powered heater.

6. The method of claim 1, wherein the heating includes providing heat from an electric power generator.

7. The method of claim 1, wherein the heating includes providing heat from a catalyzed chemical reaction.

8. The method of claim 1, wherein the heating includes providing heat from nuclear decays within radioisotopes.

9. The method of claim 1, wherein the heating includes providing heat from thermal contact with nuclear reactor components.

10. The method of claim 1, wherein the hydrocarbon molecules are a fuel and wherein the hydrogen gas is at least partially decomposed into molecular hydrogen.

11. The method of claim 1, wherein the decomposing includes decomposing the hydrocarbon molecules at a temperature above 800° C.

12. The method of claim 1, wherein the decomposing includes decomposing the hydrocarbon molecules at a temperature above 900° C.

13. The method of claim 1, wherein the decomposing includes decomposing the hydrocarbon molecules at a temperature above 1000° C.

14. The method of claim 1, wherein the separating is carried out, at least in part, by coating the elemental or molecular carbon on a surface.

15. The method of claim 14, further comprising detaching at least some of the elemental or molecular carbon as a coating from said surface by a flexing motion of said surface.

16. The method of claim 14, further comprising detaching at least some of the elemental or molecular carbon as a coating from said surface by changing a temperature of said surface.

17. The method of claim 1, wherein the separating includes separating at least some of the elemental or molecular carbon with a carbon dust filter that allows passage of at least some of the hydrogen gas.

18. The method of claim 17, wherein said separating includes continuously cleaning the filter.

19. The method of claim 17, wherein said separating includes periodically cleaning the filter.

20. A method of separating carbon from hydrocarbon molecules, the method comprising:
heating hydrocarbon molecules beyond their boiling point;
decomposing the heated hydrocarbon molecules to generate elemental or molecular carbon and hydrogen gas;
separating at least some of the elemental or molecular carbon from the hydrogen gas, wherein the separating includes separating at least some of the elemental or molecular carbon with a carbon dust filter that allows passage of at least some of the hydrogen gas, and cleaning the filter with a beater;
compacting said separated elemental or molecular carbon with a plunger to form a compacted mass of said separated elemental or molecular carbon that is urged by the plunger to a compactor system exit;
chemically reacting the hydrogen gas to produce heated exhaust gasses including water vapor; and
applying some of the heated exhaust gasses by using a heat exchanger in carrying out said heating.

21. The method of claim 19, wherein said cleaning is carried out with a beater.

22. A method of separating carbon from hydrocarbon molecules, the method comprising:
heating hydrocarbon molecules beyond their boiling point;
decomposing the heated hydrocarbon molecules to generate elemental or molecular carbon and hydrogen gas;
separating at least some of the elemental or molecular carbon from the hydrogen gas, wherein the separating includes separating at least some of the elemental or molecular carbon with a carbon dust filter that allows passage of at least some of the hydrogen gas, and cleaning the filter with a vibrator;
mechanically compacting said separated elemental or molecular carbon to form a compacted mass of said separated elemental or molecular carbon;
chemically reacting the hydrogen gas to produce heat; and
applying some of the heat, via a heat exchanger, in carrying out said heating.

23. The method of claim 19, wherein said cleaning is carried out with a vibrator.

24. The method of claim 18, wherein said cleaning is carried out with a fluid, a gas, or a combination thereof.

25. The method of claim 19, wherein said cleaning is carried out with a fluid, a gas, or a combination thereof.

26. The method of claim 1, further including engaging a carbon compactor system disposed to carry out said compacting and disposed to locate the compacted mass into a storage area.

27. The method of claim 26, further including engaging a carbon compactor system disposed to carry out said compacting and disposed to locate the compacted mass in a storage area.

28. The method of claim 1, further including fueling an internal combustion engine with the hydrogen gas.

29. The method of claim 1, further including reacting the hydrogen gas in a reaction chamber.

30. The method of claim 1, further including fueling a fuel cell with the hydrogen gas.

31. The method of claim 1, further including fueling a boiler with the hydrogen gas.

32. The method of claim 1, further including fueling a furnace with the hydrogen gas.

33. The method of claim 1, further including fueling a water heater with the hydrogen gas.

34. The method of claim 1, further including fueling a thermoelectric generator with the hydrogen gas.

35. The method of claim 1, further including fueling a photovoltaic generator with the hydrogen gas.

36. The method of claim 1, further including fueling catalyzed chemical reaction with the hydrogen gas.

37. The method of claim 1, further including simultaneously fueling more than one device with the hydrogen gas.

38. The method of claim 1, wherein the chemically reacting is performed while said hydrogen gas is preheated by said heating to a temperature above 500° C.

39. The method of claim 38, further including making fertilizer from the elemental or molecular carbon.

40. The method of claim 38, further including making a colorant from the elemental or molecular carbon.

41. The method of claim 38, further including making a lubricant from the elemental or molecular carbon.

42. The method of claim 38, further including making a sintered object from the elemental or molecular carbon.

43. The method of claim 38, further including making an alloy or chemical compound from the elemental or molecular carbon.

44. The method of claim 38, further including making a fuel from the elemental or molecular carbon.

45. The method of claim 38, further including making an explosive from the elemental or molecular carbon.

\* \* \* \* \*